United States Patent [19]
Talbot et al.

[11] Patent Number: 5,385,671
[45] Date of Patent: Jan. 31, 1995

[54] MAGNESIUM HYDROXIDE RECOVERY

[75] Inventors: Marie M. B. Talbot, Montrose; Marie M. J. Talbot, Hayfields; Francis D. Urbaniak-Hedley, Lincoln Meade, all of South Africa

[73] Assignee: Adcock Ingram Self Medication (Proprietary) Limited, Natal, South Africa

[21] Appl. No.: 145,901

[22] Filed: Oct. 29, 1993

[30] Foreign Application Priority Data

Nov. 3, 1992 [ZA] South Africa .................. 92/8469

[51] Int. Cl.$^6$ .............................................. B01D 6/168
[52] U.S. Cl. ............................. 210/636; 210/651
[58] Field of Search ............... 210/636, 651, 257.2, 210/259, 321.79, 321.87

[56] References Cited

U.S. PATENT DOCUMENTS

| | | | |
|---|---|---|---|
| 3,525,588 | 8/1970 | Hwang | 23/201 |
| 4,655,928 | 4/1987 | Milton et al. | 210/259 X |
| 4,810,389 | 3/1989 | Mallory | 210/650 |
| 5,240,600 | 8/1993 | Wang et al. | 210/259 X |

FOREIGN PATENT DOCUMENTS

256505 5/1988 Germany .

OTHER PUBLICATIONS

Chemical Engineering, vol. 96, No. 1, 1989, Stephen L. Michaels, "Crossflow Microfilters", p. 86.

*Primary Examiner*—Frank Spear
*Attorney, Agent, or Firm*—Pennie & Edmonds

[57] ABSTRACT

A method for the separation of magnesium hydroxide from a mixture of particulate magnesium hydroxide and dissolved sodium sulphate in water and for the washing and thickening of the magnesium hydroxide, includes the steps of pumping the mixture from a holding tank 14 through an ultrafiltration module comprising two banks 16, 18 of tubular membranes to which is applied a back pressure so that the dissolved sodium sulphate passes through the membrane pores positioned substantially at right angles to the direction of flow as a permeate; adding water to the holding tank 14 at a rate substantially equal to the permeate flow rate until the sulphate concentration in the magnesium hydroxide is less than a desired level; and then discontinuing the water addition thus allowing the magnesium hydroxide to thicken until a desired viscosity is reached.

10 Claims, 2 Drawing Sheets

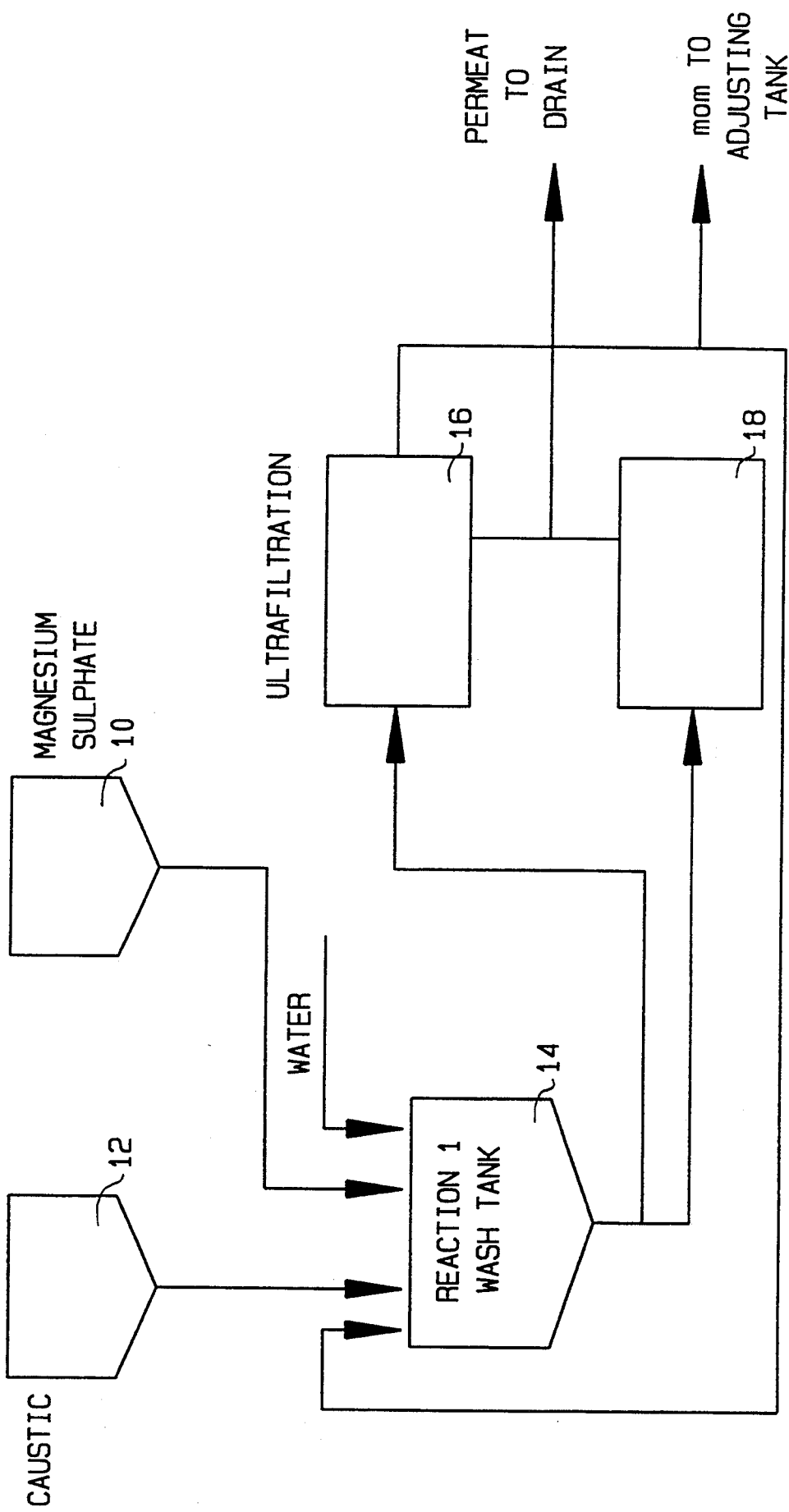
FIG. 1 Schematic of milk of magnesia manufacturing process indicating use of ultrafiltration for the washing and thickening stages

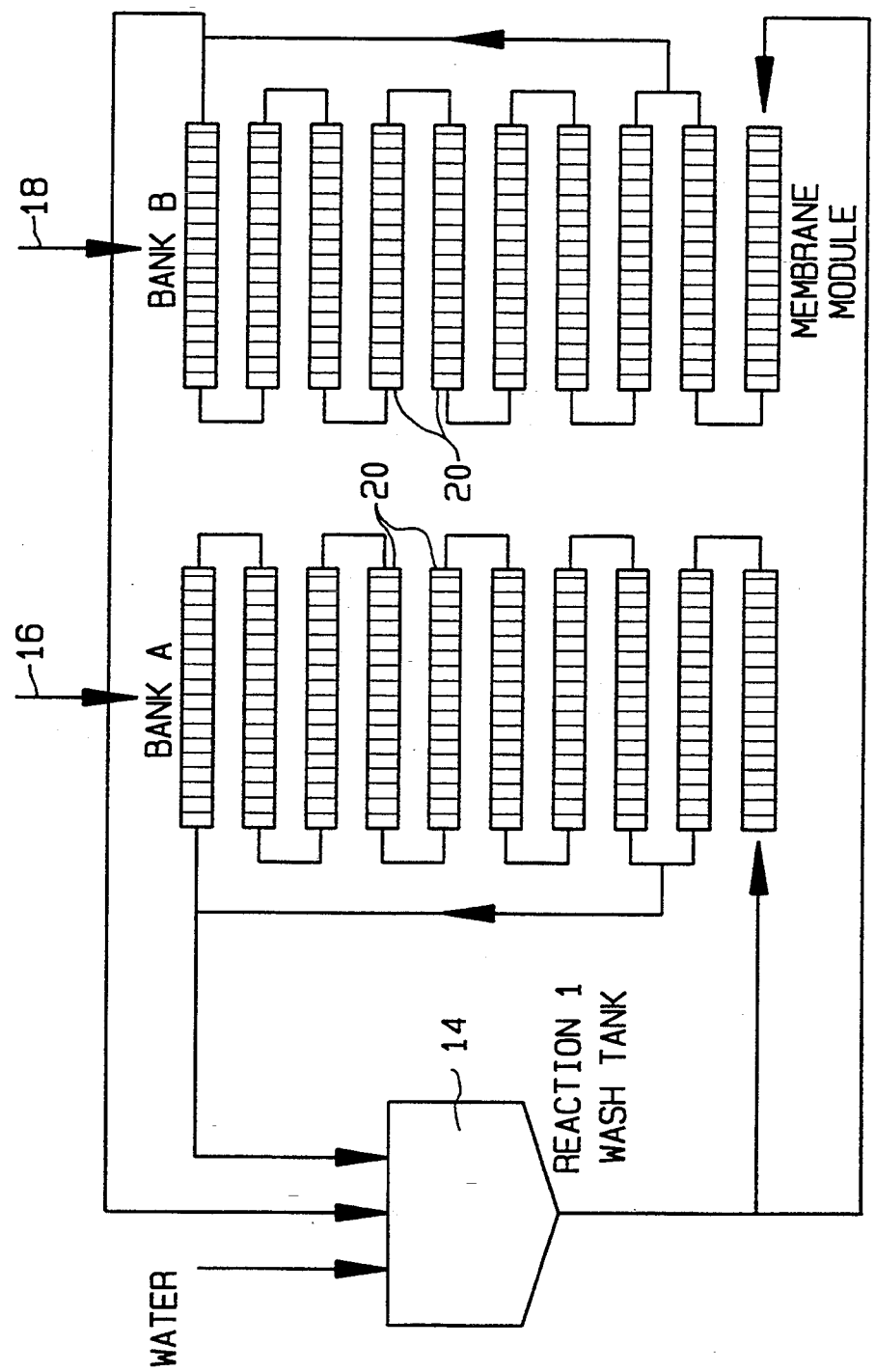

MAGNESIUM HYDROXIDE RECOVERY

BACKGROUND OF THE INVENTION

This invention relates to a method for the separation of magnesium hydroxide from a mixture of particulate magnesium hydroxide and dissolved sodium sulphate in water and for the washing and thickening of the magnesium hydroxide.

Magnesium hydroxide (also known as milk of magnesia) is a product of the reaction of magnesium sulphate and sodium hydroxide as follows:

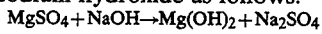

$$MgSO_4 + NaOH \rightarrow Mg(OH)_2 + Na_2SO_4$$

Once the reaction is complete, the soluble sodium sulphate must be separated from the particulate magnesium hydroxide.

In the existing precipitation process, this separation is achieved by conventional filtration techniques where the particles of magnesium hydroxide are retained by a filter surface while the sodium sulphate passes through and constitutes the wasted filtrate. Water is added in batch mode or continuously, thereby decreasing the sulphate concentration in the magnesium hydroxide to less than 0.1% (m/v). This process takes typically 3 to 4 days to prepare a batch of 2700 liters of $Mg(OH)_2$ suspension with a concentration of ca. 8% m/m and consumes great quantities of water and steam. Once the required concentration of sodium sulphate is achieved, water addition is stopped and the filtration process is allowed to continue, thereby progressively increasing the concentration and viscosity of the magnesium hydroxide. When the viscosity reaches the desired level, the magnesium hydroxide is ready for final concentration adjustment prior to packing.

There is a need for a new method for the recovery, of magnesium hydroxide from the reaction mixture.

SUMMARY OF THE INVENTION

According to the invention there is provided a method for the separation of magnesium hydroxide from a mixture of particulate magnesium hydroxide and dissolved sodium sulphate in water and for the washing and thickening of the magnesium hydroxide which includes the steps of:

(a) pumping the mixture from a holding tank through an ultrafiltration module comprising a plurality of tubular membranes to which is applied a back pressure so that the dissolved sodium sulphate passes through the membrane pores positioned substantially at right angles to the direction of flow as a permeate;

(b) adding water to the mixture prior to its introduction into the ultrafiltration module, preferably to the holding tank, at a rate substantially equal to the permeate flow rate until the sulphate concentration in the magnesium hydroxide is less than a desired level; and (c) then discontinuing the water addition thus allowing the magnesium hydroxide to thicken until a desired viscosity is reached.

Preferably, in steps (a) and (b) the applied back pressure and the mixture flow rate through the ultrafiltration module are balanced to ensure the optimal passage of the water containing the dissolved sodium sulphate through the membranes without a build-up of magnesium hydroxide particles on the membrane surfaces.

The flow rate may be from 20 000 liters per hour to 60 000 liters per hour inclusive, while the applied back pressure may be from 0.1 bar to 1.5 bar inclusive. An optimal balance is provided by a flow rate of about 32 000 liters per hour and an applied back pressure of about 0.5 bar.

Preferably, in step (b), water addition is continued until the sulphate concentration in the magnesium hydroxide is less than 0.1% (m/v).

Preferably in step (c), the magnesium hydroxide is allowed to thicken until a viscosity of approximately 200 centistokes (0.0002 $m^2$/s) is reached.

BRIEF DESCRIPTION OF THE DRAWINGS

FIG. 1 is a flow chart of a magnesium hydroxide manufacturing process; and

FIG. 2 is a flow chart of a magnesium hydroxide recovery process according to the invention.

DESCRIPTION OF AN EMBODIMENT

Referring to the drawings, magnesium hydroxide (milk of magnesia or room) is the product of the reaction of magnesium sulphate, held in a tank 10. and sodium hydroxide (also known as caustic) held in a tank 12, in a reaction/wash tank 14. The reaction gives a mixture of particulate magnesium hydroxide and dissolved sodium sulphate in water.

To separate the magnesium hydroxide particles from the water containing the dissolved sodium sulphate, the mixture is pumped using a positive displacement pump, through an ultrafiltration module consisting of two banks 16, 18, each of ten tubular membranes 20, the tubular membranes 20 being arranged in series within each bank 16, 18 and the banks 16, 18 operating in parallel. The pump is connected to a pressure gauge which indicates the proper functioning of the pump, thereby ensuring that the right flow velocities are maintained within the tubular membranes 20. In the event of incorrect velocity, the pump is immediately stopped and an indication given to the operator. This is necessary in order to prevent clogging of the tubular membranes 20.

The tubular membranes are manufactured of polysulphone and have a nominal molecular weight limit of between 20 000 and 80 000 Daltons, preferably about 40 000 Daltons.

In its passage through the tubular membranes 20, the reaction mixture experiences cross-flow filtration whereby the dissolved sodium sulphate passes through the membrane pores positioned substantially at right angles to the direction of the flow, as a permeate.

The shear and turbulence of the mixture at the surface of the membrane is responsible for preventing the build-up of magnesium hydroxide particles on the membrane surface.

Passage of dissolved sodium sulphate through the membrane to form the permeate is a function not only of this cross-flow arrangement, but of an applied back pressure on the ultrafiltration module. This back pressure provides the driving force for the passage of the aqueous solution containing the dissolved sodium sulphate through the membrane.

There must be a balance between the back pressure applied and the velocity of the mixture through the ultrafiltration module because the back pressure has a tendency to encourage polarisation of insolubles at the membrane surface, while flow through the membrane maintains the surfaces clean. The preferred mixture flow rate is about 32 000 liters per hour with an applied back pressure of about 0.5 bar.

Water is added continuously into the reaction/wash holding tank 14 at a rate substantially equal to the permeate flow rate, i.e. the flow rate of the water containing the dissolved sodium sulphate.

The washing is maintained until the sulphate concentration in the magnesium hydroxide is reduced to less than 0.1%, at which stage the water supply to the holding tank 14 is discontinued. Conductivity can be used to determine the required sulphate concentration using an on-line conductivity, meter on the filtrate line.

Discontinuing the addition of water permits the magnesium hydroxide to thicken. This is achieved on a reduced membrane surface area, usually 10 to 25% of that used for the washing process. Thickening proceeds until a viscosity of about 200 centistokes (0.0002 $m^2/s$) is achieved. At this stage the thickened magnesium hydroxide is transferred to an adjusting tank and the process is terminated.

It is to be noted that the applied back pressure and the mixture flow rate are dependent on factors such as the size of the batch to be manufactured, the desired speed of washing and thickening, and the configuration of the membrane modules.

The advantages of the method of the invention are firstly extremely short washing rates. Use of ultrafiltration techniques gives an 18 hour washing period per ton of final product per meter$^2$ of floor space. This compares with about 302 hours for conventional methods such as pan filters.

Secondly, the method provides extremely short thickening rates. The thickening period using ultrafiltration techniques is about 29 hours as opposed to 215 hours with conventional methods.

As direct result of the above two advantages, major space savings can be achieved.

Further, the ultrafiltration technique permits the method to meet the required criteria for a good manufacturing process, i.e. maintenance of batch integrity and the use of closed vessels to prevent the ingress of dirt.

Finally, energy consumption during the washing phase is greatly reduced since liquid only needs to be maintained at a temperature of 50° C. for 6% of the time presently taken.

We claim:

1. A method for the separation of magnesium hydroxide from a mixture of particulate magnesium hydroxide and dissolved sodium sulphate in water and for the washing and thickening of the magnesium hydroxide which includes the steps of:
   (a) pumping the mixture from a holding tank through an ultrafiltration module comprising a plurality of tubular membranes to which is applied a back pressure so that the dissolved sodium sulphate passes through the membrane pores positioned substantially at right angles to the direction of flow as a permeate;
   (b) adding water to the mixture prior to its introduction into the ultrafiltration module at a rate substantially equal to the permeate flow rate until the sulphate concentration in the magnesium hydroxide is less than a desired level; and
   (c) then discontinuing the water addition thus allowing the magnesium hydroxide to thicken until a desired viscosity is reached.

2. A method according to claim 1 wherein in step (b) the water is added into the holding tank.

3. A method according to claim 1 wherein in steps (a) and (b) the applied back pressure and the mixture flow rate through the ultrafiltration module are balanced to ensure the passage of the water containing the dissolved sodium sulphate through the membranes without a build up of magnesium hydroxide particles on the membrane surfaces.

4. A method according to claim 3 wherein in steps (a) and (b) the mixture flow rate is from 20 000 liters per hour to 60 000 liters per hour inclusive.

5. A method according to claim 4 wherein in steps (a) and (b) the applied back pressure is from 0.1 bar to 1.5 bar inclusive.

6. A method according to claim 3 wherein in steps (a) and (b) the mixture flow rate is about 32 000 liters per hour and the applied back pressure is about 0.5 bar.

7. A method according to claim 1 wherein in step (b) the water addition is continued until the sulphate concentration in the magnesium hydroxide is less than 0.1% (m/v).

8. A method according to claim 1 wherein in step (c) the magnesium hydroxide is allowed to thicken until a viscosity of approximately 200 centistokes (0.0002 $m^2/s$) is reached.

9. A method according to claim 1 wherein the ultrafiltration module comprises two banks of tubular membranes, the tubular membranes in each bank being arranged in series, and the two banks being arranged in parallel.

10. A method according to claim 9 wherein in each bank consists of ten tubular membranes, the tubular membranes being arranged in series.

* * * * *